United States Patent [19]

Jones

[11] Patent Number: 4,629,040
[45] Date of Patent: Dec. 16, 1986

[54] SOFT SADDLE BAG WITH RIGID REINFORCING INSERT

[75] Inventor: William L. Jones, Philo, Ill.

[73] Assignee: Vetter Products, Inc., Rantoul, Ill.

[21] Appl. No.: 649,700

[22] Filed: Sep. 12, 1984

[51] Int. Cl.⁴ .............................................. A45C 13/00
[52] U.S. Cl. .................... 190/102; 190/122; 190/124; 190/127; 220/408; 220/410; 224/32 R; 224/32 A
[58] Field of Search ............... 190/102, 103, 107, 108, 190/122, 123, 127, 900, 104, 124; 150/52 E; 224/32 R, 32 A, 39; 220/408, 85 H, 410, 411, 413, 901; 206/45.16, 594

[56] References Cited

U.S. PATENT DOCUMENTS

| | | | |
|---|---|---|---|
| 389,579 | 9/1888 | Langfeld | 190/103 |
| 1,329,194 | 1/1920 | Makruzin | 190/122 |
| 1,474,108 | 11/1923 | Downey | 220/408 |
| 1,521,260 | 12/1924 | Trachtenberg | 190/108 |
| 1,680,539 | 8/1928 | Hadi | 206/45.16 |
| 2,087,951 | 7/1937 | Jarvis | 190/108 |
| 2,319,729 | 5/1943 | Ford | 190/102 |
| 2,531,302 | 11/1950 | Schwennicke | 190/127 |
| 2,779,373 | 1/1957 | Koepke | 220/410 |
| 2,797,839 | 7/1957 | Root | 220/408 |
| 3,068,972 | 12/1962 | Armstrong | 190/107 |
| 3,363,730 | 1/1968 | Guss | 190/122 |
| 3,662,803 | 5/1972 | Kuvik | 150/52 E |
| 3,729,038 | 4/1973 | Ekeson | 150/52 E |
| 3,741,434 | 6/1973 | Traverse | 220/410 |
| 3,861,504 | 1/1975 | McGraw | 190/108 |
| 3,893,649 | 7/1975 | Cornell et al. | 383/35 |
| 3,979,011 | 9/1976 | Schleicher | 220/85 H |
| 4,059,207 | 11/1977 | Jackson et al. | 224/32 R |
| 4,138,054 | 2/1979 | Spencer | 383/119 |
| 4,160,496 | 7/1979 | Knight | 190/107 |
| 4,210,230 | 7/1980 | Weiner | 190/107 |
| 4,442,960 | 4/1984 | Vetter | 190/108 |

FOREIGN PATENT DOCUMENTS

| | | | |
|---|---|---|---|
| 2825325 | 12/1979 | Fed. Rep. of Germany | 190/127 |
| 1474951 | 3/1967 | France | 190/103 |
| 260921 | 11/1926 | United Kingdom | 190/104 |
| 2024612 | 1/1980 | United Kingdom | 190/127 |

Primary Examiner—Joseph Man-Fu Moy
Assistant Examiner—David Fidei
Attorney, Agent, or Firm—Wood, Dalton, Phillips, Mason & Rowe

[57] ABSTRACT

According to the invention, a rigid insert is provided in a soft luggage shell. The insert conforms to the configuration of the inside luggage surface and is removably held in place by a twistable retainer ring. The ring is encased in a cloth sleeve and mounted to the luggage in the vicinity of an edge of the insert. By twisting the ring, the ring and associated sleeve can be selectively placed either abuttingly against the insert or away from the insert to allow its removal. The invention also contemplates the provision of a protective shield which is removably mounted to a surface of the luggage which abuts a carrying vehicle.

12 Claims, 11 Drawing Figures

SOFT SADDLE BAG WITH RIGID REINFORCING INSERT

BACKGROUND OF THE INVENTION

1. Field of the Invention

This invention relates to luggage having a soft shell and, more particularly, to a rigid reinforcing insert for removable placement in the shell.

2. Background Art

Luggage is often constructed with a pliable, fabric shell. The fabric construction accounts for lightweight luggage and low manufacturing costs. Soft luggage is readily collapsible for storage and handling.

The primary drawbacks with the soft shell are first that it generally does not effectively maintain its overall shape with the luggage partially empty and second that it is not resistant to deformation under impacts that are potentially damaging to the contents of the luggage.

It is known to provide a rigid reinforcing frame to conform to the contour of the overlying fabric as shown in U.S. Pat. No. 3,955,727, to Montgomery. Because the frame and shell are bolted to each other to maintain them in proper relationship, collapsibility, which is a desired feature with soft luggage, is precluded. Separation of the frame and shell is not contemplated.

Another shape retaining stiffener is disclosed in U.S. Pat. No. 2,531,302, to Schwennicke. The stiffener is assembled by bolting, which makes it an integral part of the shell and difficult to separate. Accordingly, the disadvantages in Montgomery are also present in Schwennicke.

Another problem that has plagued the luggage art is the problem of abrasion occurring between luggage and a vehicle upon which the luggage is mounted. This is particularly true with motorcycles where there is considerable vibration and abrupt shifting of the vehicle often occurs during maneuvering. This has prompted a number of designers to develop frames that carry the luggage in spaced relationship to the carrying vehicle. This often results in a substantial expenditure and an obtrusive addition to the vehicle.

The present invention is specifically directed to overcoming one or more of the above enumerated problems in a novel and simple manner.

SUMMARY OF THE INVENTION

According to the invention, a rigid insert is provided for placement internally of a deformable luggage shell, such as one made from pliable fabric. The insert conforms to the contour of the inside luggage surface and both maintains the shape of the luggage and shields against an impact to prevent damage to its contents.

In another aspect of the invention, a retainer is provided in the shell to secure the insert so that it is readily removable. The retainer comprises a continuous strip that is stiff yet deformable and encased along at least a portion of its length in a flexible sleeve secured to the wall of the shell to situate the strip in the vicinity of an edge of the insert. The strip binds with the inside wall surface of the shell and is twistable between positions that either draw the sleeve against the edge of the insert or move the sleeve away from the insert so that the insert can be removed. The binding of the strip within the shell keeps both the strip and sleeve in each of the above positions.

According to the invention, the insert is readily, selectively anchored or removed from the shell. Anchoring and release of the insert can be accomplished simply by twisting the strip through approximately 180°. The sleeve and strip are fixed to the shell and occupy minimal usable space within the compartment. No separate fasteners are needed to secure the insert.

The invention also contemplates the provision of a protective shield on the luggage which shield is interposed between a vehicle and a vehicle engaging surface on the luggage. To facilitate mounting of the shield, a system of straps and buckles cooperate with anchoring loops on the bag to effect mounting. The mounting arrangement permits ready placement of the shield on the bag and removal therefrom in the event that the shield is not desired, as with the luggage carried separately from the vehicle.

Other objects and advantages of the invention will become apparent upon reviewing the following detailed description taken in conjunction with the drawings and the appended claims.

DETAILED DESCRIPTION OF THE DRAWINGS

Figure 1:
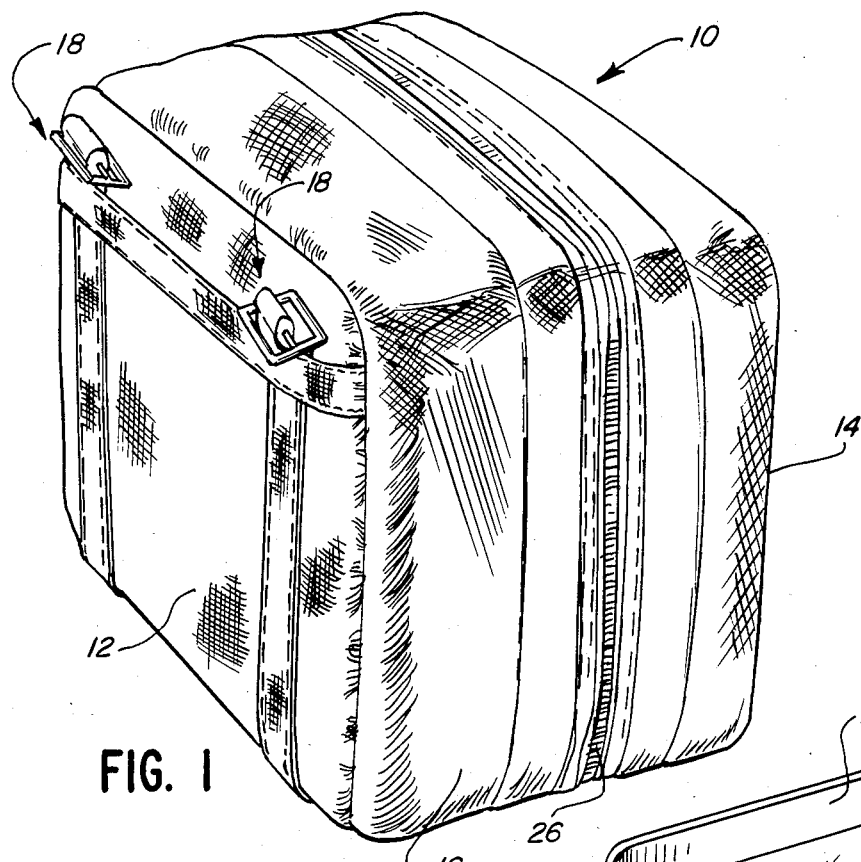
FIG. 1 is a perspective view of a piece of luggage adapted for mounting to a motorcycle, which luggage is suitable for incorporation of the present invention.

FIGS. 1–4 illustrate an exemplary piece of luggage at 10, which is suitable for incorporation of the present invention. The luggage 10 has a squared configuration with opposite faces 12 and 14 and a continuous wall 16 therebetween. The one face 12 is designed to abut a carrying vehicle and is provided with mounting straps and buckles at 18. The entire outer shell, comprising the faces 12, 14 and the wall 16 is made from fabric, preferably a durable nylon. The shell is unreinforced so as to be readily collapsible.

The luggage 10 comprises separable compartment halves 20, 22, which are joined by a cloth hinge 24 along one portion of the wall 16 and by a zipper 26 about the remainder of the wall. The separable nature of the luggage 10 facilitates loading and unloading.

One aspect of the invention is the provision of a removable insert 28 in each of the compartment halves 20, 22. Each insert 28 comprises a bottom 30 with a peripheral rim 32 with the bottom and rim conforming respectively to the bottom 34 of each compartment and a portion of an inside peripheral wall surface 36 extending about the bottom 34. Each insert 28 is preferably molded from a plastic material and fits closely within its respective compartment. The inserts 28 are rigid enough to maintain the configuration of the compartments and resist deformation as upon being impacted.

It is another aspect of the invention to provide a retainer for each of the inserts so that the inserts can be readily removably maintained within the luggage. The retainer, shown generally at 38, comprises a continuous flexible ring 40 encased in a cloth sleeve 42. The ring is preferably made from a stiff plastic that is sufficiently flexible that it can be twisted inside out. The ring 40 is dimensioned to fit compressively within the compartment so that it bears on the inside wall surface 36 substantially along its length. The cloth defining the sleeve 42 is doubled over itself and stitched at 44, which serves as a pivot edge for the sleeve. The sleeve fits about the ring closely enough that the ring cannot twist inside the sleeve.

Figure 2:
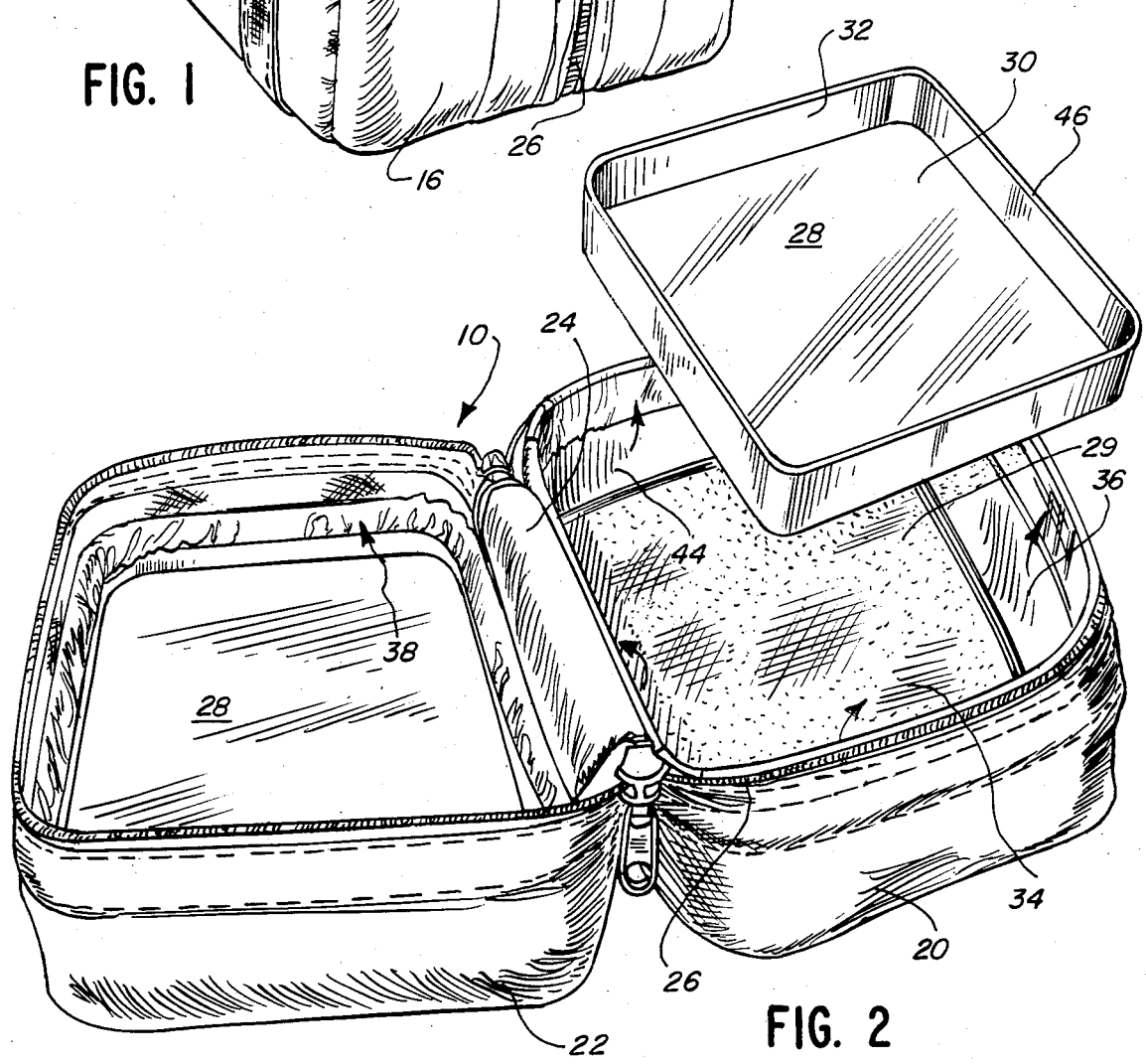
FIG. 2 is a perspective view of the luggage of FIG. 1 in an open state and incorporating a preferred form of rigid insert and retainer therefor according to the present invention, with one of the inserts separated from the luggage and the other anchored in place.
Figure 3:
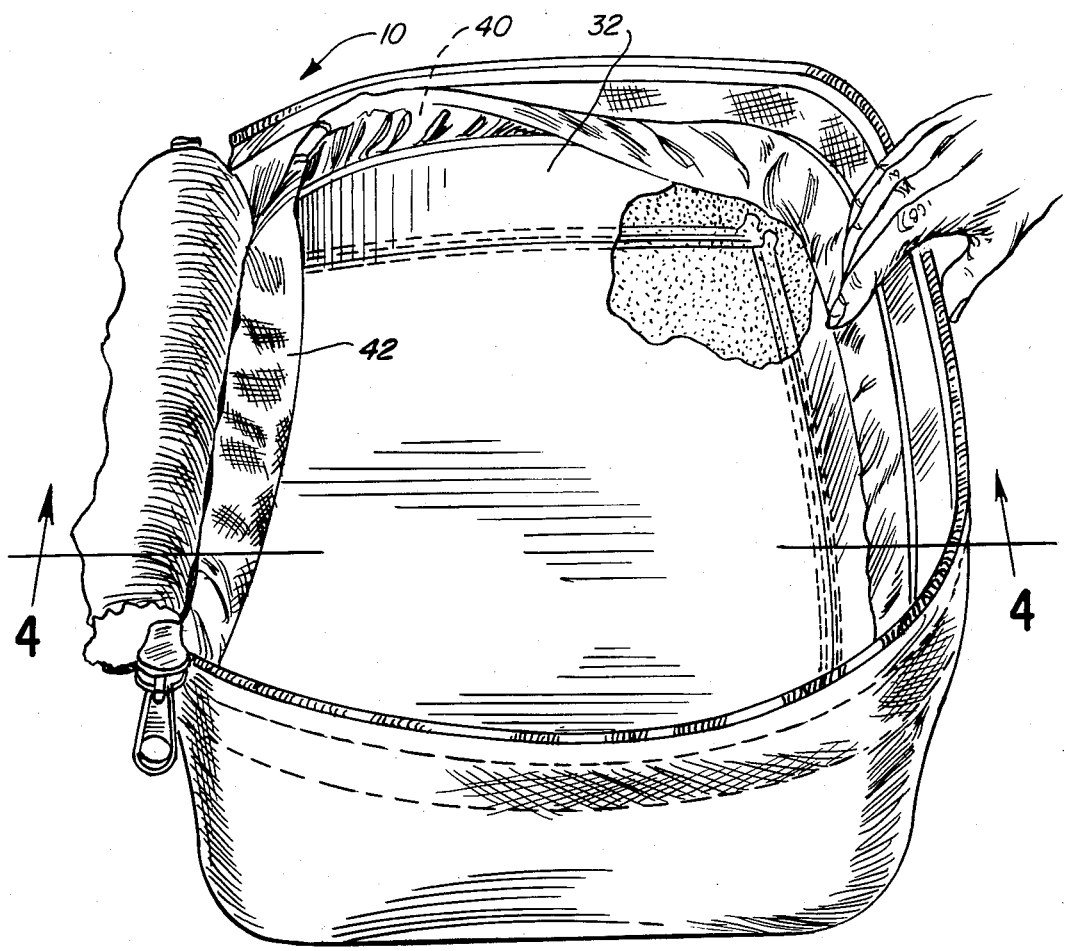
FIG. 3 is a perspective view of one portion of the luggage of FIGS. 1 and 2 with the retainer partially in its anchoring position.
Figure 4:
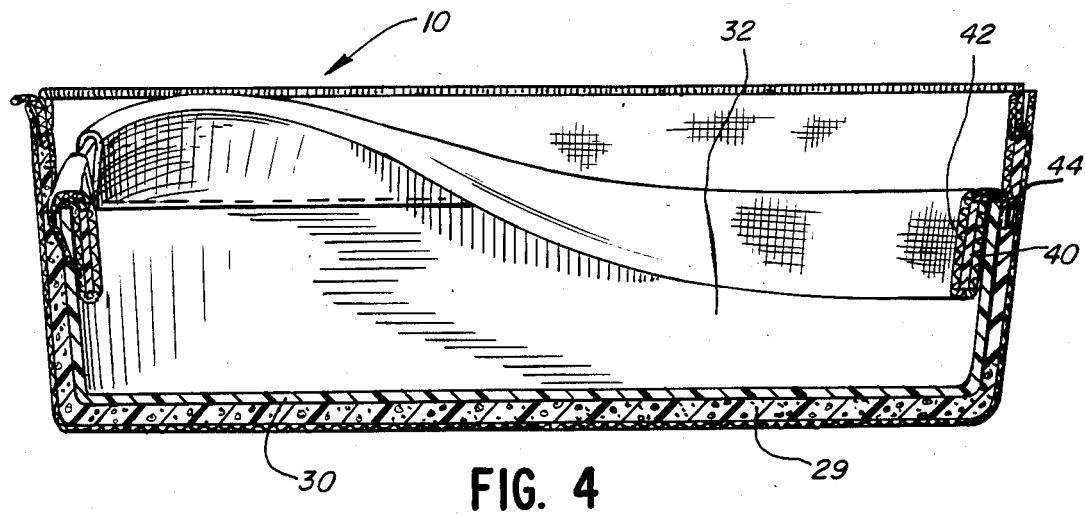
FIG. 4 is a sectional view of the luggage portion along line 4—4 of FIG. 3.

To assemble the insert, the ring is positioned as shown in compartment 20 of FIG. 2, that is with the ring twisted so it pivots to its uppermost position about the stitched area 44. The retainer, so positioned, allows admission of the insert 28 which is placed so that the bottom 30 of the insert facially abuts the bottom 34 of the compartment half. With the insert fully seated, the ring 40 is twisted downwardly. This is accomplished by starting anywhere on the ring and progressively twisting along the length of the ring about the stitched area 44. As the ring is twisted downwardly, it draws with it the cloth sleeve 42 and both the cloth sleeve and ring are caused to bear on the upper edge 46 of the insert 28 and captively retain the insert in conjunction with the bottom wall 34 of the compartment half. Removal of the insert 28 involves merely twisting the ring and sleeve to move it upwardly and to free the insert 28. A foam layer is shown on the compartment bottom 30 of the insert. The foam prevents slipping between the luggage and insert to enhance anchoring of the insert. The foam also absorbs impact to the luggage.

It can be seen that the retainer can be simply manipulated and is integral with the luggage and does not compete for space with baggage within the compartment. No separate fasteners are required. By simple twisting of the ring, the insert can either be anchored or freed.

It should be noted that while a continuous ring is disclosed, the invention would operate in similar fashion with a strip that extends only part ways around the inside wall surface 36 of the shell. The invention encompasses any strip or ring that is twistable inside out and that can be situated to block removal of the insert.

Figure 5:
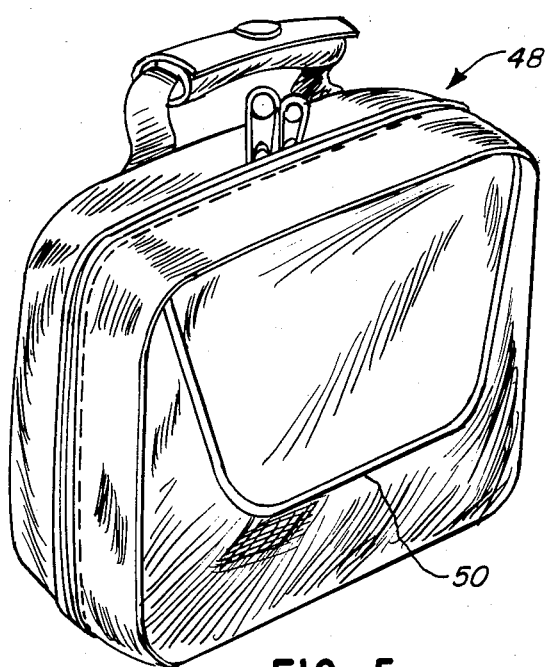
FIG. 5 is a perspective view of a piece of luggage having an alternative configuration to that in FIG. 1 and which is suitable for incorporation of the present invention.
Figure 7:
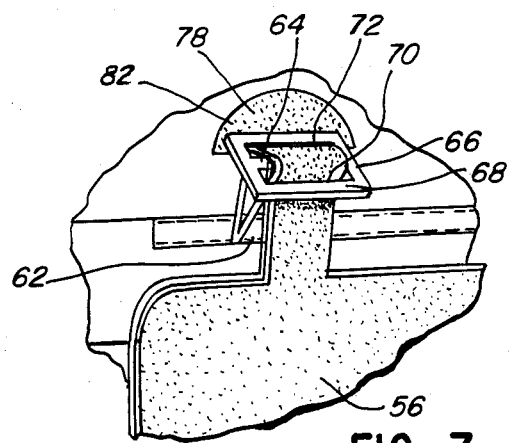
FIG. 7 is an enlarged, fragmentary, perspective view of one of the mounting straps for attaching the upper portion of the shield to the luggage.
Figure 8:
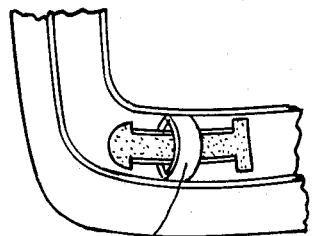
FIGS. 8–10 sequentially show the steps for assembling an anchoring strap associated with the bottom of the shield.
Figure 6:
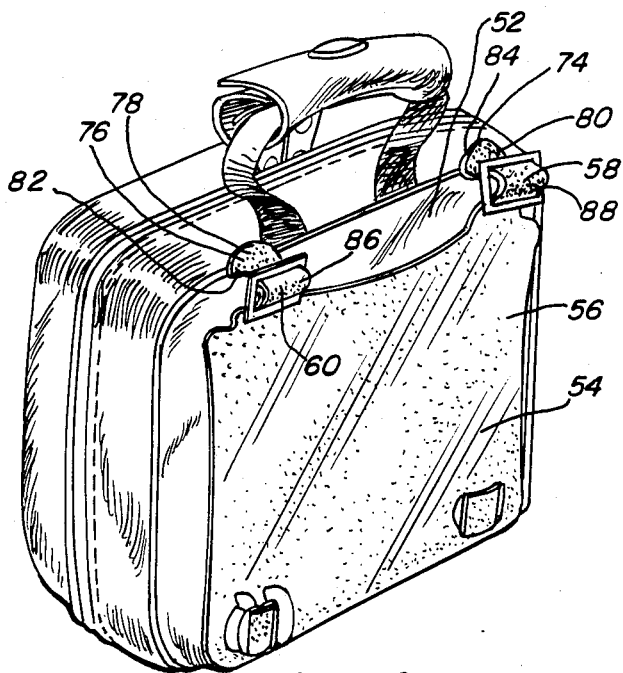
FIG. 6 is a perspective view of the piece of luggage in FIG. 5 from the side opposite that shown in FIG. 5 and incorporating a protective shield according to the present invention.
Figure 9:
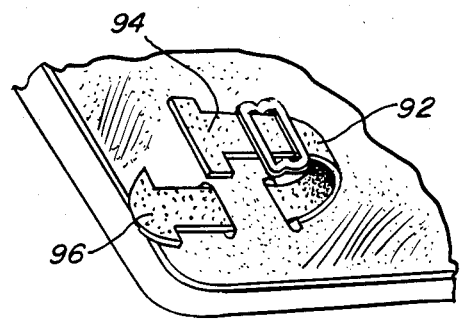

FIG. 5 shows an alternative configuration for a luggage piece at 48, with which the present invention is operable. The primary distinction is that the face 50 opposite the vehicle abutting face 52 is convex to expand the storage capability. The insert (not shown) is configured to conform to the shape of the face 50. The insert and associated retainer otherwise function in the same manner as those in the prior FIGS. 1–4.

In FIGS. 6–11, a further aspect of the invention is illustrated in relationship to the modified luggage 48 of FIG. 5. A protective shield 54 is mounted to the vehicle abutting face 52 to protect the luggage from vehicle abrasion. This is particularly a problem with motorcycles which may be shifted abruptly during maneuvering and which constantly vibrate.

The shield 54 comprises a flat layer of plastic, cloth leather, or the like. Integrally formed with the rectangular body 56 of the shield 54 are two straps 58, 60. The straps 58, 60 are used to suspend the shield from the upper region of the luggage. At the upper region of the luggage, a loop 62 is sewn in place and surrounds a rib 64 on a buckle 66. The buckle 66 has a rectangular body 68 which defines, in conjunction with the rib 64, spaced, parallel slots 70, 72 on opposite sides of the rib.

To assemble the straps 58, 60, the ends 74, 76 are extended in one direction, upwardly through the one slot 72, over the rib 64 and oppositely downwardly through the opposite slot 72. To prevent release of the straps, the strap ends 74, 76 are each provided with an enlarged head 78, 80. The heads 78, 80 are substantially hemispherical and have side extensions 82, 84 which protrude beyond the edges of the bodies 86, 88 of the straps. The extensions 82, 84 are folded in towards each other to allow passage through the slots 70, 72. Upon passage through the slots, the extensions on each strap spread outwardly and interfere with the buckle to prevent removal of the strap from the buckle.

Adjacent the bottom of the face 52, separate straps 90 are used to attach the shield and luggage. Each strap 90 comprises a body 92 and a cross-piece 94 making a T with the body 92 at one end and an enlarged hemispherical head 96 at the other end. The straps 90 cooperate with separate loops 98 on the luggage and loops 100 on the shield defined by spaced slits 102, 104 to secure the shield.

Figure 10:
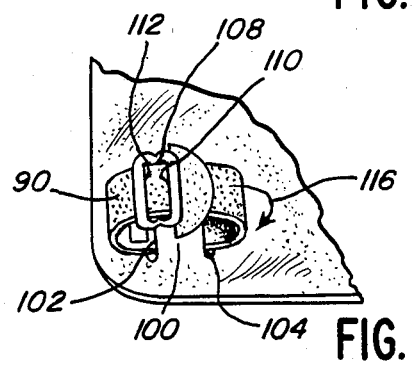
Figure 11:
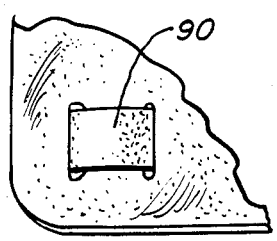
FIG. 11 is a view similar to that in FIG. 10 with the assembled strap rotated approximately 180° to situate a buckle on the strap behind the shield.

To assemble the straps 90, a buckle 106, comparable to the buckle 66, previously described, is provided. The buckle comprises a central rib 108 and slots 110, 112 adjacent and on opposite sides thereof. The buckle is attached to the strap by extending the head 96 in a first direction through slot 112, over rib 108 and in an opposite direction through slot 110. The buckle is slid along the body 92 until it abuts the cross piece 94. The strap is then extended around coinciding loops 98, 100 on the luggage and shield respectively. The strap is doubled over itself and the head 96 re-extended through the buckle to define a continuous loop as shown in FIG. 10. To prevent abrasion of the carrying vehicle by the buckle, the strap with the associated buckle is rotated from the FIG. 10 position in the direction of the arrow 116 to the position shown in FIG. 11, wherein the buckle is on the luggage side of the shield and therefore cannot come into direction contact with the vehicle.

It should be understood that the foregoing detailed description was made for purposes of clarifying the structure and operation of the present invention, with no unnecessary limitations to be derived therefrom.

I claim:

1. A retainer for a substantially rigid insert in a luggage shell, said luggage shell having a bottom surface and a continuous inside surface defining storage space in conjunction with the bottom surface, said insert abutting the bottom surface with the insert in place in the shell and having a wall with an edge adjacent the wall surface, said retainer comprising:

a flexible strip; and means mounting the strip on the wall surface so that the strip is biased against the wall surface with the insert in a first position and thereby maintains the insert in the shell and for twisting movement of the strip back and forth between the first position and a second position wherein the retainer is spaced away from the edge of the insert so that the insert can be placed in and removed from the luggage shell without deforming the insert.

2. The retainer of claim 1 wherein said set means comprise a sleeve attached to said wall surface and said strip is carried in said sleeve.

3. A retainer for a substantially rigid insert in a luggage shell having a bottom surface and a continuous inside wall surface defining storage space in conjunction with the bottom surface, said insert abutting the bottom surface with the insert in place in the shell and having a wall with an edge adjacent the wall surface, said retainer comprising:
   a flexible strip; and
   means mounting the strip on the wall surface for twisting movement between a first position wherein the insert is held captive in the shell between the bottom shell surface and the retainer and a second position wherein the retainer is spaced away from the edge of the insert allowing placement in and removal of the shell without deforming the insert,
   wherein said strip is a continuous ring and the means mount the strip closely against the inside wall surface of the shell in said first position with the insert removed from the shell.

4. The retainer of claim 2 wherein said sleeve is at least partially a pliable fabric.

5. The retainer of claim 2 wherein said sleeve is stitched to the inside wall surface.

6. A retainer for an insert in a luggage shell, said luggage shell having a bottom surface and a continuous inside wall surface extending angularly away from the bottom surface and defining a baggage storage space in conjunction with the bottom surface, said insert having a bottom wall abutting the bottom shell surface with the insert in place in the shell and having a wall extending from the bottom wall of the insert, said insert having a free edge adjacent the wall surface of the shell, said retainer comprising:
   a continuous, twistable, flexible strip fitting closely against the inside wall surface of the shell substantially along the length of the strip;
   a pliable member defining a sleeve surrounding at least a portion of the flexible strip for keeping the flexible strip in place in the shell; and
   means attaching the sleeve to the shell in the vicinity of the free edge for twisting movement of the sleeve and strip between a first position in which one of the sleeve and means attaching the sleeve overlaps said free edge of said insert to keep the insert captive in place in the shell and a second position in which the retainer is moved from the free edge to allow placement in and removal of the insert from the shell.

7. The retainer of claim 6 wherein said flexible strip is plastic and is twistable inside out between the first and second positions.

8. The retainer of claim 6 wherein said pliable member is cloth and the pliable member is doubled over against itself in a contact area and the contact area is stitched to the wall surface of the shell.

9. The improved saddlebag of claim 1 wherein said outer shell is constructed at least partially from a cloth fabric.

10. The improved saddlebag of claim 1 wherein each said insert is molded plastic.

11. The improved saddle bag of claim 1 wherein said shell comprises separable halves and an insert is fit in each of said halves.

12. An improved saddlebag of the type having a deformable outer shell comprising separable halves, each said shell half having a bottom wall and an inside wall surface extending angularly from the bottom wall, said shell halves joinable to cooperatively define a storage space, the improvement comprising:
   a substantially rigid insert for placement in the storage space and against the inside surface and bottom wall of at least one of the shell halves,
   said insert conforming substantially to a portion of both the bottom wall and inside wall surface of the shell half, maintaining the shape of the shell half and resisting potentially damaging impact to the shell; and
   means for selectively, removably maintaining the insert in the shell half,
   wherein said means comprises a flexible strip, a sleeve surrounding at least a portion of the strip and means mounting the strip and sleeve on the wall surface for twisting between a first position wherein said means bears against said insert to keep the insert in place in the shell and a second position wherein the strip and sleeve are twisted so that the means for maintaining is moved away from the insert allowing removal of the insert from the shell, whereby the saddlebag can be selectively used with or without an insert.

* * * * *